United States Patent [19]

Guzik

[11] Patent Number: 5,491,413

[45] Date of Patent: * Feb. 13, 1996

[54] POSITIONING DEVICE FOR MAGNETIC HEAD AND DISK TESTER WITH ROTATING TOOL SUPPORT

[75] Inventor: Nahum Guzik, San Jose, Calif.

[73] Assignee: Guzik Technical Enterprises, Inc., San Jose, Calif.

[*] Notice: The portion of the term of this patent subsequent to Oct. 19, 2010, has been disclaimed.

[21] Appl. No.: 127,684

[22] Filed: Sep. 27, 1993

[51] Int. Cl.⁶ .......................... G01R 33/12; G11B 5/54; G11B 21/14
[52] U.S. Cl. .................. 324/212; 360/105; 369/222
[58] Field of Search .................. 324/210, 212, 324/262; 360/75, 105, 96.6, 109, 110, 122, 128, 104, 106–108; 369/222, 250, 265

[56] References Cited

U.S. PATENT DOCUMENTS

| | | | |
|---|---|---|---|
| 2,375,658 | 5/1945 | Johnson | 369/222 |
| 3,936,733 | 2/1976 | Clary | 364/262 |
| 4,138,121 | 2/1979 | Nakajima et al. | 369/222 |
| 4,364,121 | 12/1982 | Stewart | 369/250 |
| 4,902,971 | 2/1990 | Guzik et al. | 324/212 |
| 5,254,946 | 10/1993 | Guzik | 324/262 |
| 5,285,338 | 2/1994 | Sugahara et al. | 360/105 |

*Primary Examiner*—Sandra L. O'Shea
*Assistant Examiner*—Roger Phillips
*Attorney, Agent, or Firm*—David Pressman

[57] ABSTRACT

A positioning device for magnetic head and disk tester comprises a base plate (100) which supports a rotary spindle (170), for rotating a magnetic disk (168) with a medium to be tested or to be used for testing, and a rotary platform (150) which may slide in one direction (A) along guide shafts (106 and 108) attached to the base plate (100). The rotary platform rotatingly supports a tool support (208) which supports a mechanical arm (218). The latter supports a pair of head holders (220 and 222) with respective read-write heads (228 and 222) to be tested or to be used for testing the disk. The positioning device of this type makes it possible to replace the heads in a convenient position unobstructed by other parts. This is achieved by unlocking the tool support (208) from the rotatable platform (150) by pushing down a lock finger (234) and turning the tool support with the head away from the working position.

12 Claims, 3 Drawing Sheets

POSITIONING DEVICE FOR MAGNETIC HEAD AND DISK TESTER WITH ROTATING TOOL SUPPORT

BACKGROUND

1. Field of the Invention

The present invention relates to the field of magnetic recording, particularly to testers for magnetic read-write heads and computer hard disks.

2. Description of Prior Art

Prior to assembling computer disk drives, their main components, i.e., magnetic read-write heads and magnetic disks, are usually checked on magnetic head and disk testers. Such testers normally have a positioning mechanism required for accurately positioning a read-write gap of a magnetic read-write head above a specified track of a disk.

One known magnetic head and disk tester, is disclosed in U.S. patent application Ser. No. 5,254,946, granted 1993 Oct. 19 to by Guzik. A positioning device of this tester includes a base plate which slidingly supports a moveable housing which can slide along the base plate in one direction: the base rotate supports a rotatable platform. The rotatable platform rigidly and releasably supports a mechanical arm which extends radially inwardly towards the center of rotation of the rotatable platform and supports a head holder with a read-write head on its free end in such a position that the read-write gap of the head coincides with the position of the center of rotation of the rotary platform.

Positioning of the head to a position required for testing is performed by controlling displacements of the moveable housing (for shifting the head from track to track) and rotations of the rotatable platform. Also controlled are the mechanical arm and the head holder with the head supported by the rotatable platform (for setting a skew angle specified for the particular track).

However, the radial arm and head holder have fixed positions with respect to the rotatable platform. Therefore, an essential disadvantage of this design is that an access is available only to the upper side of the mechanical arm and, therefore, the head to be tested can be connected and disconnected to and from the mechanical arm only from above. This means that only one head which is positioned on the upper side of the mechanical arm can be tested one at a time. As a result, a head replacement operation must be performed very frequently. Moreover, the test head can interact only with one side of the disk. If the test object is a disk, the disk has to be turned over to test its bottom surface.

Furthermore, since the heads are replaced in a position close to their working position over the disk, there is a risk of damaging delicate and expensive parts of the tester.

OBJECTS OF THE INVENTION

It is an object of the invention to provide a positioning device for magnetic head and disk testers which allows testing of two or more heads and two sides of the disk the same time and which improves the convenience, reliability, and safety of the replacement and testing of heads.

Further objects and advantages will become apparent after the following description and the accompanying drawings.

APERCU

Figure 1:
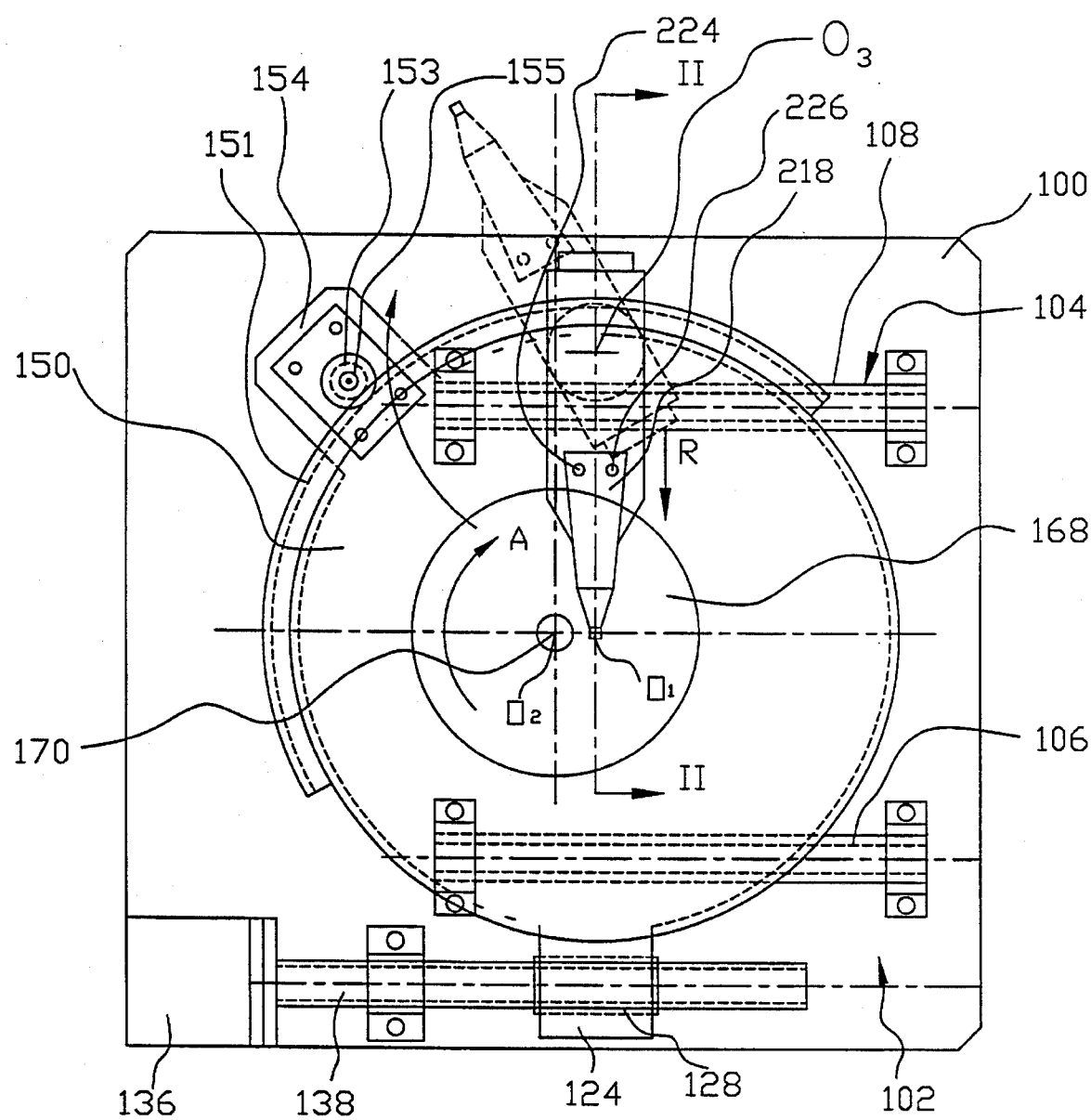
FIG. 1 is a top schematic view of the device of the invention.

In accordance with the invention, a tool support for a magnetic head and disc tester supports an arm having a pair of heads above the medium to be tested. The tool support is selectively unlockable and rotatable to a head replacement position away from its working position above the medium.
FIG. 1—Description—Positioning Device for Magnetic Head and Disk Testers FIG. 1 is a top view of the tester of the invention. The tester has a base plate 100, which supports linear slide mechanisms 102 and 104. Stationary shafts 106 and 108 of the slide mechanisms are rigidly attached to base plate 100 and function as linear guides. Sliding bushings (not shown) are mounted into a moveable housing 124 which is guided along stationary shafts 106 and 108. Movements of moveable housing 124 are governed by a first stepper motor 136 through a lead screw 138, which is connected to the output shaft of stepper motor 136, and a threaded insert 128 located in moveable housing 124. Stepper motor 136 is supported by base plate 100.

Slide mechanisms 102 and 104 are rigidly interconnected through above-mentioned moveable housing 124. This housing rotatingly supports a rotatable platform 150 which carries on its outer side a gear ring 151, which engages a drive gear pinion 153. The latter is rigidly attached to a shaft 155 of a second stepper motor 154. Stepper motor 154 is also supported by moveable housing 124. Thus, second stepper motor 154 rotates rotatable platform 150 around its geometrical center $O_1$.

Figure 2:
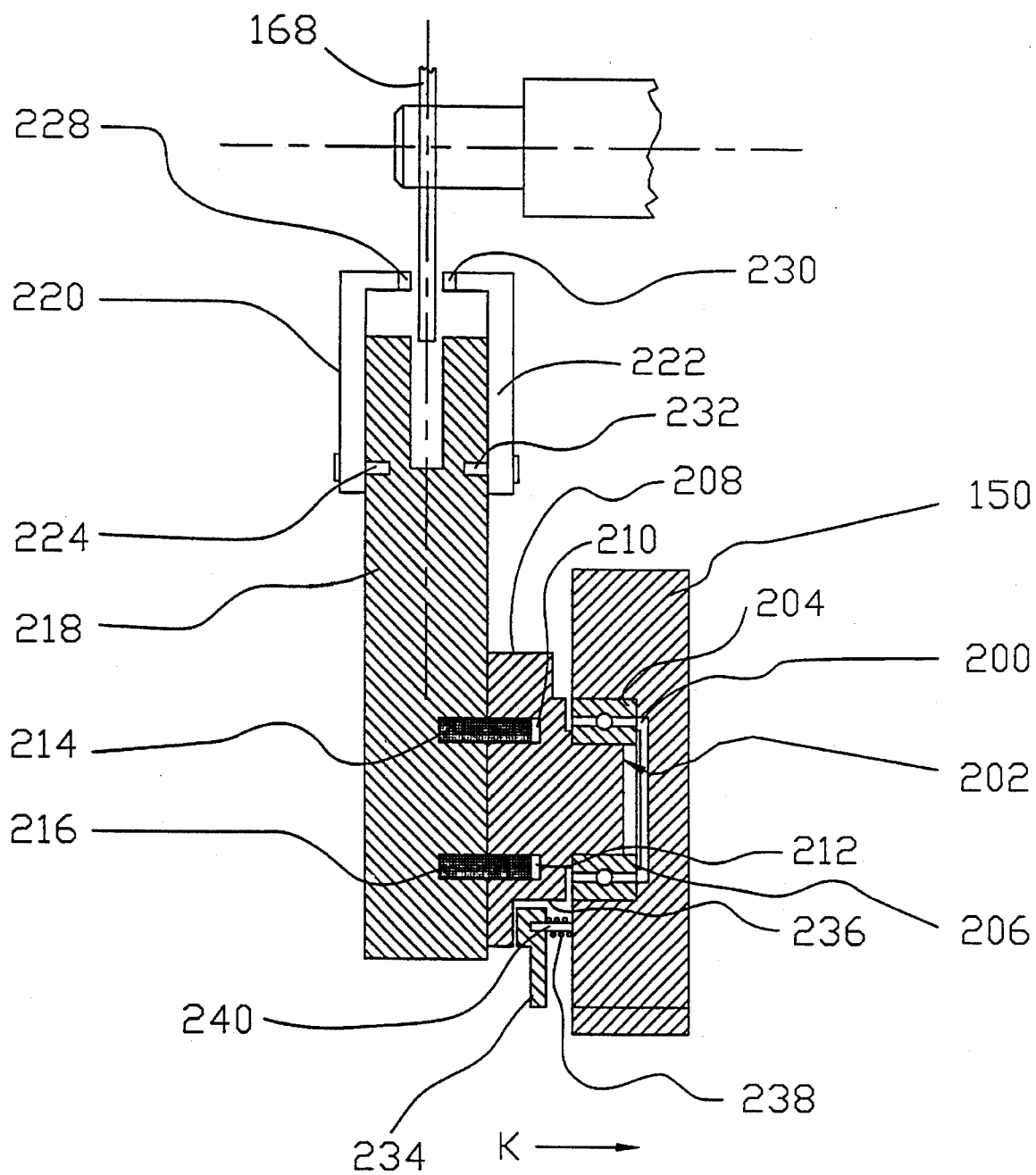
FIG. 2 is a sectional view in the direction of line II—II of FIG. 1.

Magnetic disk 168 is mounted on a spindle 170 and is rotated in the direction of arrow A around spindle center $O_2$ from a rotary motor (not shown).
FIG. 2—Cross-Sectional View As shown in FIG. 2, which is a sectional view in the direction of lines II—II of FIG. 1, rotatable platform 150 has a recess 200 which accommodates a ball bearing 202. An outer ring 204 of ball bearing 202 is press-fitted to recess 200, while an inner ring 206 of the ball bearing rotatingly supports a tool support 208. The latter has mounting holes 210 and 212 for the insertion of control pins 214 and 216, which are provided on the bottom side of a mechanical arm 218.

As shown in FIGS. 1 and 2, mechanical arm 218 extends radially in the direction of arrow R inwardly towards geometrical center $O_1$ of rotatable platform 150. Mechanical arm 218 supports head holders 220 and 222 which are rigidly fixed to mechanical arm 218, e.g., by screws 224 and 226 and supports a pair of read-write magnetic heads 228 and 230 arranged on opposite side of disk 168 for interaction with the media on the upper and lower sides of the disk, respectively.

Lower head holder 222 is attached to mechanical arm 218 with the use of screws, only one of which, i.e., a screw 232, is shown in FIG. 2.

Mechanical arm holder 218 can be locked into a fixed position with respect to rotatable platform 150 by means of a locking finger 234 which engages a recessed portion 236 on tool support 208. Locking finger 234 is normally urged upward to the engagement position with recess 236 by spring 238, which is mounted over a pin 240 attached to rotatable platform 150.

In order to unlock tool support 208, locking finger 234 should be pressed down in the direction of arrow K.

With the locking finger pressed down, mechanical arm 218 can be turned pivoted around its center of rotation $O_3$ (FIG. 1) away from the working position, to the position shown by the dash-and-dot lines in FIG. 1, so that head holder 220 and 222 with heads 228 and 230 can be easily removed from mechanical arm 218 in a position convenient for replacement.

Since in the above-mentioned head-replacement position the working end of the mechanical arm with head holders 220 and 222 extends outward in a cantilever manner, there is an easy access not only to upper head holder 220 but to lower head holder 222 as well, so that it can be easily removed from the mechanical arm. This was unattainable with the earlier described conventional tester.

Figure 3:
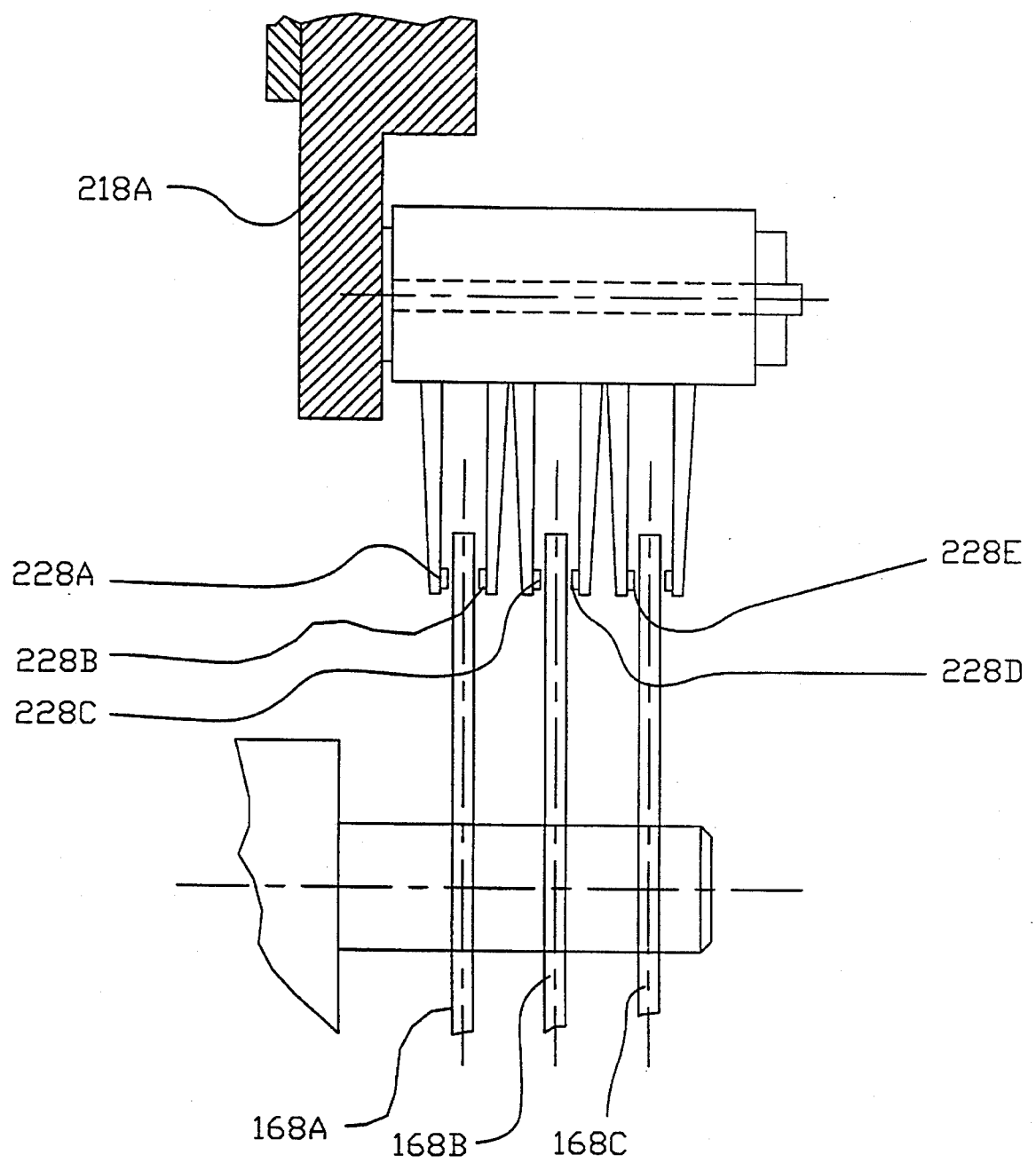
FIG. 3 is a view similar to FIG. 2 illustrating testing of a head stack.

FIG. 3—Embodiment with Multiple Arms

For increasing the efficiency and productivity of testing, the tool holder may be modified as shown in FIG. 3 at 218a to support a plurality of heads 228a, 228b, 228c, 228d, and 228e, which interact with a plurality of magnetic disks 168a, 168b, and 168c, which are in turn supported by the same spindle 170. Such a set of heads on a single tool is known as a head stack. The use of a head stack does not change the principle of the invention, and preserves all the advantages and features which have been described above with reference to an embodiment involving the testing of a single or a pair of read-write heads in relation with a single disk.

FIGS. 1 to 3—Operation

The device of FIGS. 1 through 3 operates generally in the same manner as a conventional device and differs from it only by the head replacement operation.

The characteristics of a read-write head and the medium of a disk are measured in a read-write process which is carried out by a so-called read and write gap of a magnetic head in a manner known in the art.

Prior to testing, mechanical arm 218 is turned to a head-replacement position which is shown in dash-and-dot lines in FIG. 1. As stated, head holders 228 and 230 with respective heads are attached to both sides of mechanical arm 218 and fixed by screws 224, 226, and 232. The mechanical arm is then turned into the working position shown by solid lines in FIG. 1, where it is fixed by lock finger 234 and where the position of the read-write gaps of the heads coincide exactly with center $O_1$.

After placing heads 228 and 230 to a required position, a test can be started by moving the heads from track to track of disk 168 with the use of stepper motor 136, while a skew angle specified for each track is adjusted with the use of stepper motor 154. These movements are normally performed under control of a computer in a manner known in the art. This procedure is beyond the scope of the present invention.

For replacement of head holders 220 and 222 with heads 228 and 230 upon the completion of the preceding operation, locking finger 234 is pressed down in the direction of the arrow K, so that tool support 208 is released and is turned in the direction of arrow D (FIG. 1) to a position shown by the dash-and-dot line. In this position, turned away from the delicate parts of the tester, head holders 220 and 222 with heads 228 and 230 may be removed from mechanical arm 218 in a convenient position unobstructed by other parts of the tester. Mechanical arm 218 is then returned to working and the procedure is repeated.

In the case of a head stack of the type shown in FIG. 3, the testing and head change operations are essentially the same as in the case of two heads. The only difference is that in the head change position the entire block consisting of a head holder and a plurality of heads is replaced as a unit instead of disconnecting the head holders individually.

If necessary, the head holders and heads can be replaced together with mechanical arm 218 which can be disconnected from tool support 208 by withdrawing control pins 214 and 216 from holes 210 and 212.

SUMMARY, RAMIFICATIONS, AND SCOPE

Thus, it has been shown that I have provided a greatly improved positioning device for magnetic head and disk testers which facilitates the replacement of heads to be tested and makes the replacement operation convenient, reliable, and simple.

Although the positioning device has been shown in the form of specific embodiments, its parts, materials, and configurations are given only as examples, and many other modifications of the positioning device are possible. For example, transparent optical disks may be used instead of magnetic disks; locking fingers may be of the pivotal-type, rather than the sliding-type; the mechanical arm can be supported by a sliding bearing rather than by a ball bearing; other driving mechanisms are possible, besides stepper motors and gears. Therefore, the scope of the invention should be determined not by the examples given, but by the appended claims and their legal equivalents.

I claim:

1. A positioning device for a magnetic head and disk tester comprising:

a base plate, a slide mechanism supported by said base plate and having slide means for enabling said slide mechanism to slide on said base plate in one direction, a moveable housing supported by said slide mechanism and moveable with said slide mechanism;

said slide mechanism having a first drive means supported by said base plate for linearly displacing said moveable housing in said one direction, a rotatable platform rotatably supported by said moveable housing, said rotatable platform having a geometrical center of rotation, a second drive means supported by said moveable housing for rotating said rotatable platform around said geometrical center of rotation of said rotatable platform, a rotary spindle rotatably supported by said base plate within the circumference of said rotatable platform, said rotary spindle arranged to hold at least one magnetic disk for rotating with said spindle, said disk being of the type which has a plurality of read-write tracks for interaction with a plurality of read-write heads to be tested, a tool support supported by said rotatable platform, said tool support having a center of rotation, at least one magnetic head and attaching means for releasably attaching said magnetic head to said tool support, pivot means for enabling said tool support to pivot with respect to said rotatable platform from (a) a working position in which said head is located in said center of rotation of said rotatable platform to (b) a head-replacement position in which said tool support is pivoted away from said working position to a position where said head is located away from said rotatable platform, and locking means for (a) locking said tool support in said working position, or (b) releasing said tool support so that it can be pivoted to said head-replacement position.

2. The positioning device of claim 1 wherein said attaching means comprises a mechanical arm which has connecting means for releasably connecting said head to said tool support and supporting means for supporting said magnetic head.

3. The positioning device of claim 2 wherein said locking means comprises a spring-loaded element moveable between a position of engagement with said tool support and a position of disengagement from said tool support for enabling said tool support to pivot around said geometrical center of rotation of said tool support for enabling said head to be pivoted away from said working position and beyond a circumference of said rotatable platform to said head replacement position where said head can be removed without obstruction.

4. The positioning device of claim 3, further including linear guide means for said linearly displacing said rotatable platform, said first drive means comprising a first rotary-type stepper motor with an output shaft, a lead screw connected to said output shaft, and a nut which is engaged with said lead screw and is connected to said moveable housing.

5. The positioning device of claim 4 wherein said second drive means comprises a second rotary-type stepper motor with an output shaft, a first gear wheel attached to said output shaft of said second stepper motor, and a second gear wheel, which (a) engages said first gear wheel, (b) is attached to said rotary platform, and (c) has it axis of rotation in said geometrical center of rotation of said rotatable platform.

6. The positioning device of claim 5 wherein said slide means comprises at least one stationary shaft which is attached to said base plate and extends in said one direction.

7. The positioning device of claim 1, further including at least one additional magnetic head attached to said tool support, thereby to provide a pair of heads for interaction with a pair of said magnetic disks.

8. A positioning device for a magnetic head and disc tester, comprising:

a base plate, at least one guide element rigidly attached to said base plate and oriented in one direction, a moveable housing guided by said guide element in said one direction, a rotatable platform rotatably supported by said moveable housing, said rotatable platform having a geometrical center of rotation, a first drive means for linearly displacing said moveable housing along said guide element in said one direction, said first drive means being supported by said base plate, a second drive means supported by said moveable housing for rotating said rotatable platform around said geometrical center of rotation of said rotatable platform, a rotary spindle rotatably supported by said base plate within a circumference of said rotatable platform, said rotary spindle arranged to support at least one magnetic disk by which rotates therewith, said disk having a plurality of read-write tracks for interaction with a read-write head to be tested, a tool support supported by said rotatable platform, said tool support having a center of rotation, at least one magnetic head and attaching means for releasably attaching said magnetic head to said tool support, said attaching means comprising a mechanical arm releasably connected to said tool support, said mechanical arm supporting said magnetic head, pivot means for enabling said tool support to pivot with respect to said rotatable platform from (a) a working position in which said head is located in said center of rotation of said rotatable platform to (b) a head-replacement position in which said tool support is pivoted away from said working position to a position where said head is located away from said rotatable platform, and locking means for (a) locking said tool support in said working position, or (b) releasing said tool support so that it can be pivoted to said head-replacement position.

9. The positioning device of claim 8 wherein said locking means comprises a recess in said tool support and a spring-loaded element moveable between a position of, engagement with said tool recess and a position of disengagement, from said recess for enabling said tool support to pivot with said mechanical arm and said head around said geometrical center of rotation of said tool support for turning said head away from said working position and beyond said circumference of a said rotatable table where said head can be removed without obstruction.

10. The positioning device of claim 9 wherein said first drive means comprises a first rotary-type stepper motor with an output shaft, a lead screw connected to said output shaft, and a nut which is engaged with said lead screw and is connected to said moveable housing, said second drive means comprising a second rotary-type stepper motor with an output shaft, a first gear wheel attached to said output shaft of said second stepper motor and a second gear wheel, which (a) engages said first gear wheel, (b) is attached to said rotary platform, and (c) has it axis of rotation in said geometrical center of rotation of said rotatable platform.

11. The positioning device of claim 9, further including at least one additional magnetic head attached to said tool support, thereby to provide a pair of such magnetic heads, and further including at least one additional magnetic disk, thereby to provide a plurality of magnetic discs for interaction with said pair of heads.

12. A positioning device for a magnetic head and disk tester comprising:

a base plate, a slide mechanism supported by said base plate and having a slide for enabling said slide mechanism to slide on said base plate in one direction, a moveable housing supported by said slide mechanism and moveable with said slide mechanism;

said slide mechanism having a first drive motor supported by said base plate for linearly displacing said moveable housing in said one direction, a rotatable platform rotatably supported by said moveable housing, said rotatable platform having a geometrical center of rotation, a second drive motor supported by said moveable housing for rotating said rotatable platform around said geometrical center of rotation of said rotatable platform, a rotary spindle rotatably supported by said base plate within the circumference of said rotatable platform, said rotary spindle arranged to hold at least one magnetic disk for rotating with said spindle, said disk being of the type which has a plurality of read-write tracks for interaction with a plurality of read-write heads to be tested, a tool support supported by said rotatable platform, said tool support having a center of rotation, at least one magnetic head and an attachment mechanism for releasably attaching said magnetic head to said tool support, a pivot for enabling said tool support to pivot with respect to said rotatable platform from (a) a working position in which said head is located in said center of rotation of said rotatable platform to (b) a head-replacement position in which said tool support is pivoted away from said working position to a position where said head is located away from said rotatable platform, and a releasable lock means for (a) locking said tool support in said working position, or (b) releasing said tool support so that it can be pivoted to said head-replacement position.

* * * * *

UNITED STATES PATENT AND TRADEMARK OFFICE
CERTIFICATE OF CORRECTION

PATENT NO. : 5,491,413
DATED : February 13, 1996
INVENTOR(S) : Nahum Guzik

It is certified that error appears in the above-indentified patent and that said Letters Patent is hereby corrected as shown below:

Col. 1, line 20, delete "application Ser. No.".
Col. 1, line 21, delete "by".
Col. 6, l. 17, delete ",".

Signed and Sealed this

Eleventh Day of June, 1996

Attest:

BRUCE LEHMAN

Attesting Officer

Commissioner of Patents and Trademarks